US012505429B2

(12) United States Patent
Tax et al.

(10) Patent No.: US 12,505,429 B2
(45) Date of Patent: Dec. 23, 2025

(54) AUTHENTICATION USING NON-FUNGIBLE TOKEN AS PROOF OF ACCOUNT OWNERSHIP

(71) Applicant: The Toronto-Dominion Bank, Toronto (CA)

(72) Inventors: David Samuel Tax, Toronto (CA); Milos Dunjic, Oakville (CA); Anthony Haituyen Nguyen, Toronto (CA); Dean Constantin Nicholas Tseretopoulos, Toronto (CA); Edwin Van Damme, Etobicoke (CA)

(73) Assignee: The Toronto-Dominion Bank, Toronto (CA)

( * ) Notice: Subject to any disclaimer, the term of this patent is extended or adjusted under 35 U.S.C. 154(b) by 379 days.

(21) Appl. No.: 18/152,978

(22) Filed: Jan. 11, 2023

(65) Prior Publication Data
US 2024/0232858 A1    Jul. 11, 2024

(51) Int. Cl.
G06Q 20/38    (2012.01)
G06Q 20/34    (2012.01)
G06Q 20/40    (2012.01)

(52) U.S. Cl.
CPC ....... *G06Q 20/3821* (2013.01); *G06Q 20/351* (2013.01); *G06Q 20/3829* (2013.01); *G06Q 20/389* (2013.01); *G06Q 20/4012* (2013.01)

(58) Field of Classification Search
None
See application file for complete search history.

(56) References Cited

U.S. PATENT DOCUMENTS 10,540,653 B1   1/2020   James et al.
11,133,943 B2   9/2021   Ruckriemen et al.
(Continued)

FOREIGN PATENT DOCUMENTS

AU    2019372344 A1    5/2020
KR    102411652 B1     6/2022
(Continued)

OTHER PUBLICATIONS

Hewa et al.: "Survey on blockchain based smart contracts: Applications, opportunities and challenges", https://www.sciencedirect.com/science/article/abs/pii/S1084804520303234; published in Journal of Network and Computer Applications 177, dated Mar. 2021.
(Continued)

*Primary Examiner* — Patrick Mcatee
*Assistant Examiner* — Jason B Fenstermacher
(74) *Attorney, Agent, or Firm* — Rowand LLP

(57) ABSTRACT

A processor-implemented method may be performed by a server. A method may include: receiving an authentication request from a device, the authentication request including a unique identifier; authenticating the authentication request by: retrieving a non-fungible token (NFT) identifier and public key associated with the unique identifier; identifying, from a blockchain, a blockchain address that is an owner of an NFT represented by the NFT identifier; verifying that the blockchain address that is the owner of the NFT is associated with the public key that is associated with the unique identifier; and verifying that a private key stored in a secure area of the device is associated with the public key that is associated with the unique identifier; and after authenticating the authentication request, enabling an operation not available prior to authenticating the authentication request. The unique identifier may be obtained using image recognition or optical character recognition.

20 Claims, 11 Drawing Sheets

(56) References Cited

U.S. PATENT DOCUMENTS

| | | |
|---|---|---|
| 11,323,260 B2 | 5/2022 | Wang et al. |
| 2019/0220836 A1 | 7/2019 | Caldwell |
| 2021/0067342 A1 | 3/2021 | Guinard et al. |
| 2021/0097528 A1 | 4/2021 | Wang |
| 2021/0152357 A1* | 5/2021 | Wang .................. H04L 9/321 |
| 2021/0350458 A1 | 11/2021 | Gaur et al. |
| 2021/0377052 A1 | 12/2021 | Brown |
| 2023/0119838 A1* | 4/2023 | Meyers ................ A63F 13/69 |
| | | 463/42 |
| 2023/0289410 A1* | 9/2023 | Shulman ............ H04L 63/0428 |
| 2024/0070305 A1* | 2/2024 | Jurat .................. G06F 21/1011 |

FOREIGN PATENT DOCUMENTS

| | | | | |
|---|---|---|---|---|
| WO | 2020231328 A1 | 11/2020 | | |
| WO | 2022118263 A1 | 6/2022 | | |
| WO | 2022178096 A1 | 8/2022 | | |
| WO | WO-2023039344 A1 * | 3/2023 | ........... | G06F 16/955 |
| WO | WO-2024011057 A1 * | 1/2024 | ........... | H04L 9/3213 |
| WO | WO-2024073602 A1 * | 4/2024 | | |

OTHER PUBLICATIONS

Salleras et al.: "FORT: Right-proving and Attribute-blinding Self-sovereign Authentication", https://www.mdpi.com/2227-7390/10/4/617, published in Mathematics 10.4, dated Feb. 17, 2022.

* cited by examiner

AUTHENTICATION USING NON-FUNGIBLE TOKEN AS PROOF OF ACCOUNT OWNERSHIP

TECHNICAL FIELD

The present application relates to authentication and, more particularly, to systems and methods for authenticating account ownership using a non-fungible token.

BACKGROUND

Consumers are currently expected to enter a personal identification number (PIN) during some point-of-sale transactions. For example, a PIN may be required whenever a transaction amount is above a threshold or whenever consecutive PIN-less transaction counters exceed an allowed threshold.

PINs may be difficult for some customers to remember, particularly where the customers have more than one card with different PINs. Further, PINs can be prone to attacks, such as phishing attacks.

On the infrastructure side, PIN entry operation may be allowed only on certain types of merchant devices. For example, PIN entry may be allowed on Payment Card Industry (PCI) certified devices or at least on devices that follow PCI requirements. Such devices may be expensive to produce, certify and upgrade.

Thus, there is a need for authentication techniques to replace PIN entry or other existing authentication techniques.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
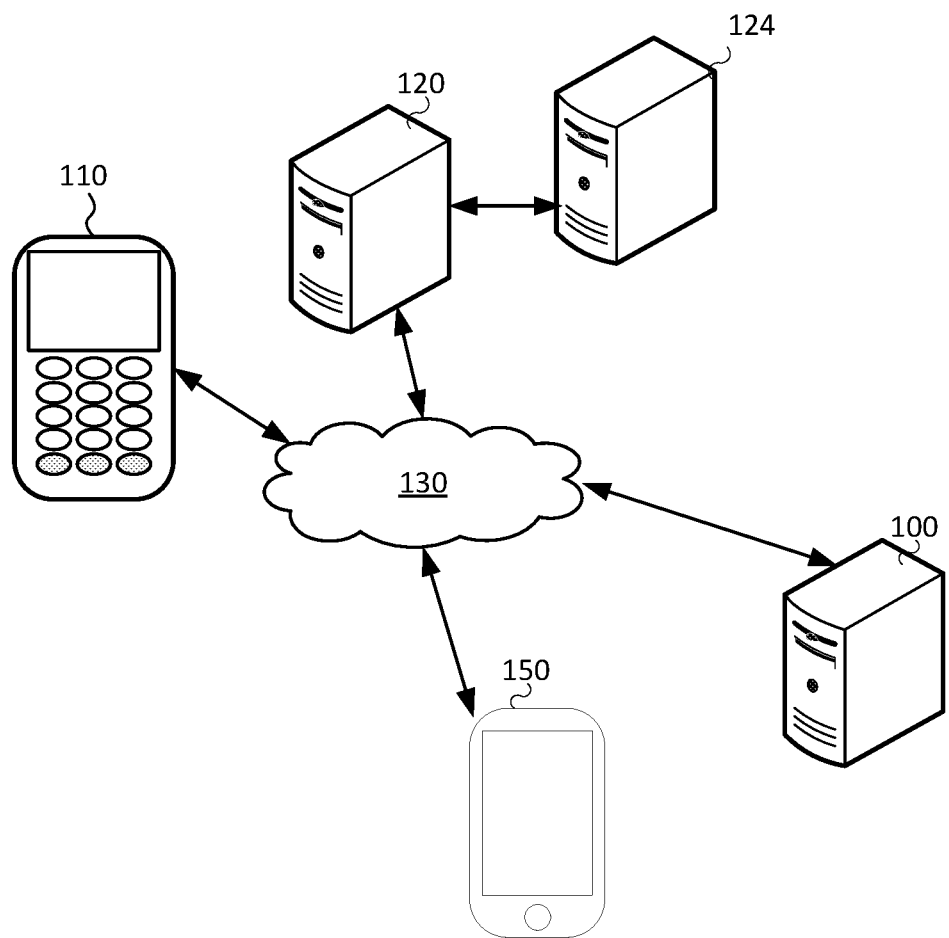
FIG. 1 is a schematic diagram illustrating an operating environment of an example embodiment.

In an aspect, a processor-implemented method is disclosed. The method may be performed by a computing system. A method may include: receiving an authentication request from a device, the authentication request including a unique identifier; authenticating the authentication request by: retrieving a non-fungible token (NFT) identifier and public key associated with the unique identifier; identifying, from a blockchain, a blockchain address that is an owner of an NFT represented by the NFT identifier; verifying that the blockchain address that is the owner of the NFT is associated with the public key that is associated with the unique identifier; and verifying that a private key stored in a secure area of the device is associated with the public key that is associated with the unique identifier; and after authenticating the authentication request, enabling an operation not available prior to authenticating the authentication request.

In some implementations, the unique identifier may be a primary account number for a payment credential. Enabling the operation may include enabling completion of a transaction at a point-of-sale terminal using the payment credential.

In some implementations, enabling the completion of the transaction may include setting an authentication flag associated with the NFT identifier to indicate that the authentication request has been authenticated.

In some implementations, the method may further include sending the NFT identifier to the point-of-sale terminal. The point-of-sale terminal may be configured to generate a personal identification number (PIN) block for a transaction message based on the NFT identifier.

In some implementations, the method may further include determining that an authentication flag associated with an NFT identifier represented by a PIN block for a received transaction message is set to indicate that an authentication request has been authenticated.

In some implementations, the method may further include linking a unique identifier with an NFT by: receiving, from a device, the public key associated with the unique identifier, the public key forming a key pair with the private key stored in the secure area of the device; assigning ownership of an NFT to a blockchain public address derived from the public key; and storing an NFT identifier associated with the NFT in association with the unique identifier.

In some implementations, the unique identifier is associated with a payment card that is issued digitally. Linking of the unique identifier with the NFT may be performed after the device has received a digital representation of the payment card.

In some implementations, the key pair may be generated within the secure area of the device.

In some implementations, the authentication request may be received from the device in response to the device scanning a machine-readable code displayed on a point-of-sale terminal.

In another aspect, a computing system is described. The computing system may include a communications module. The computing system may include a processor coupled with the communications module. The computing system may include a memory coupled to the processor and storing processor-executable instructions which, when executed by the processor, configure the computing system to perform a method described herein. For example, the instructions may configure the computing system to: receive an authentication request from a device, the authentication request including a unique identifier; authenticate the authentication request by: retrieving a non-fungible token (NFT) identifier and public key associated with the unique identifier; identifying, from a blockchain, a blockchain address that is an owner of an NFT represented by the NFT identifier; verifying that the blockchain address that is the owner of the NFT is associated with the public key that is associated with the unique identifier; and verifying that a private key stored in a secure area of the device is associated with the public key that is associated with the unique identifier; and after authenticating the authentication request, enable an operation not available prior to authenticating the authentication request.

In another aspect, a computer-readable storage medium may be provided. The computer-readable storage medium may include processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Physical tokens can be used for making purchases at a point-of-sale terminal. Such physical tokens may be configured for tap-style payments in which the physical token is placed in a communication range of a physical token reader to allow physical token data to be read from the physical token. By way of example, physical tokens may include any one or a combination of: payment cards (which may also be referred to as value transfer cards) and computing devices having a representation of a payment card stored thereon. By way of example, the physical token may be a mobile device having a mobile wallet that stores a representation of a payment card. In at least some implementations, the representation of the payment card may be issued digitally.

A physical token may be connected to one or more accounts (such as banking accounts) that store data and/or resources accessible to the cardholder. By way of example, the physical token may be associated with a bank account and/or a credit card account. The physical token may act as a credit card or a debit card.

The physical token may be configured for near-field communication (NFC) payment processing or for wireless communication-based payment processing of another type.

As will be described in greater detail below, authentication techniques may use a non-fungible token to authenticate ownership of an account. Such authentication may, for example, operate in the place of a personal identification number (PIN) so that a PIN need not be input.

FIG. 1 is a schematic operation diagram illustrating an operating environment of an example embodiment. The operating environment includes a point-of-sale (POS) terminal 110. The POS terminal 110 may communicate with a touchless transfer server 100. Such communication may be by way of the network 130. The touchless transfer server 100 may also communicate with a customer device 150 and such communication may be by way of a network, such as the network 130.

The customer device 150 is a computing device that is associated with a customer. By way of example, the customer device 150 may include any one or more of: a mobile device, a tablet computer, a laptop computer, a wearable computer, or a computing device of another type.

As will be described in greater detail below, the touchless transfer server 100 may interact with the customer device 150 to hand off at least a portion of a session to the customer device 150. The touchless transfer server 100 may be a web server or may be associated with a web server or may include a web server.

The touchless transfer server 100 may also communicate with the POS terminal. Such communication may, for example, be by way of a network, such as the network 130.

As illustrated, the point-of-sale (POS) terminal 110 may communicate with a transfer rail 120 which relays transaction data to an appropriate issuer system 124. Such communication may be via a network, such as the network 130. The transfer rail 120 may also be referred to as a payment rail.

The customer device 150 and/or the touchless transfer server 100 may also communicate with the issuer system 124. Such communication may be via one or more networks, such as the network 130.

The point-of-sale terminal is associated with an acquirer and the communication between the POS terminal 110 and the transfer rail 120 may be by way of a back-end acquirer system. The POS terminal 110 may be located at a location that is associated with a merchant. By way of example, the merchant may be a store, restaurant, gym, etc. The acquirer is a merchant bank that accepts deposits associated with transactions made at the point-of-sale terminal and facilitates settlement and deposit of those deposits into an account associated with the merchant.

While a single transfer rail 120 is illustrated in FIG. 1, in practice the POS terminal 110 may communicate with multiple transfer rails. By way of example, the transfer rail 120 may include any one or a combination of Amex™, Visa™ and/or Mastercard™. Other transfer rails may also be used. The POS terminal and/or a back-end acquirer system in communication with the POS terminal may, after obtaining data from a physical token, such as a value transfer card or a mobile device having a representation of a payment card which has engaged a physical token reader provided at the POS terminal, determine which of the transfer rails is to be used. For example, the POS terminal/acquirer system may determine that the physical token is associated with Visa™ and may, in response, select the Visa™ payment rail or it may, instead, determine that the physical token is associated with Mastercard™ and select the Mastercard™ payment rail.

After a transfer rail is identified, the POS terminal/acquirer system sends the transfer rail a message. The message may be sent through a network, such as the network 130. The message includes a value amount representing an amount of value that is to be transferred to complete a transaction and physical token data such as a primary account number (PAN) associated with a physical token. The transfer rail identifies an associated issuer based on the physical token data and communicates with the identified issuer to process the transaction. More particularly, the transfer rail 120 routes the message received from the POS terminal to an issuer system 124 for the identified issuer. The issuer system then determines whether the transaction is approved or denied based on pre-defined rules. The rules may, for example, consider any one or more of: whether the cardholder has available funds, whether the merchant is of a type that is permitted, whether the transaction violates any spending limits, etc.

When the issuer system determines whether to approve or deny the transaction, it sends a message indicating the result of this determination to the POS terminal 110 via the transfer rail 120. The result may then be displayed or otherwise output at the POS terminal 110.

The issuer system 124 may interact with a blockchain network. For example, the issuer system 124 may be a node of a blockchain network or it may interact with a node of the blockchain network. This may allow the issuer system 124 to read data from the blockchain network and/or to update the blockchain network.

The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. In other examples, the blockchain network may be a permissionless blockchain network.

The blockchain network may be a network that supports smart contract programming. For example, the blockchain network may support a standard such as the Ethereum Request for Comments (ERC) 721 standard. By way of example, in one implementation, the blockchain network may be an Ethereum network.

The issuer system 124, point-of-sale terminal 110, customer device 150, touchless transfer server 100, and the transfer rail 120 may be in geographically disparate locations. Put differently, each of issuer system 124, point-of-sale terminal 110, customer device 150, touchless transfer server 100, and the transfer rail 120 may be remote from others of the issuer system 124, point-of-sale terminal 110, customer device 150, touchless transfer server 100, and the transfer rail 120.

The issuer system 124, point-of-sale terminal 110, customer device 150, touchless transfer server 100, and the transfer rail 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
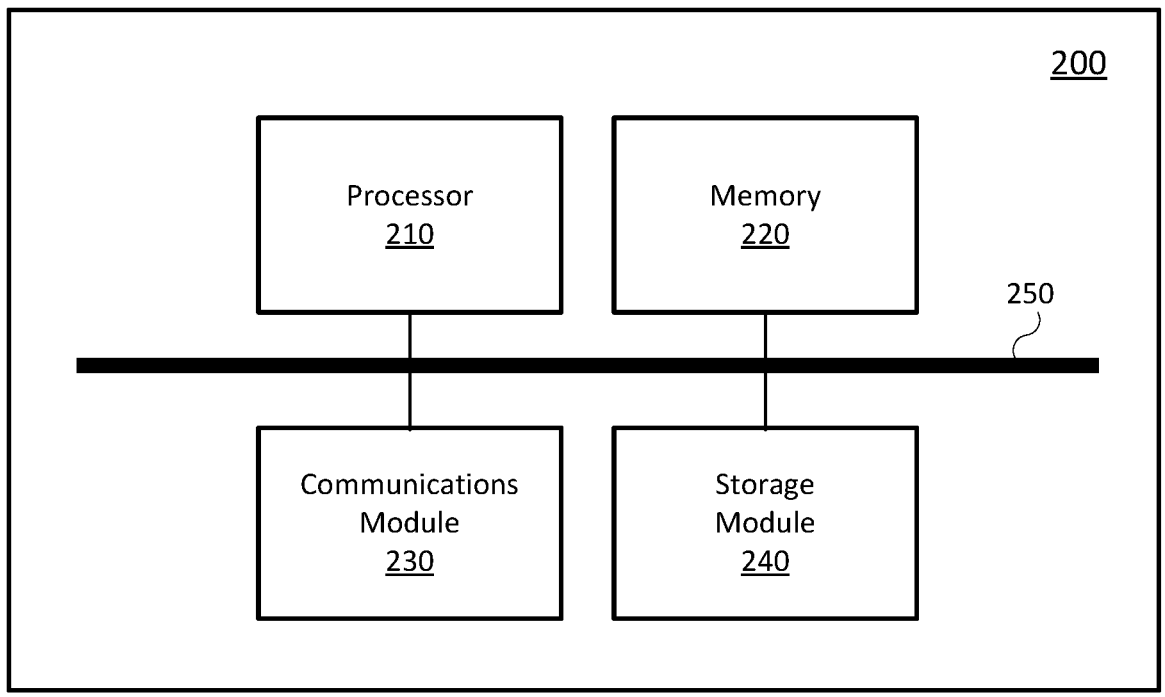
FIG. 2 is high-level schematic diagram of a computing device.

Referring now to FIG. 2, a high-level operation diagram of an example computing device 200 will now be described. The example computing device 200 may be exemplary of the issuer system 124, point-of-sale terminal 110, customer device 150, touchless transfer server 100, and/or transfer rail 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Where the computing device 200 operates as the customer device 150, the memory 220 and/or the processor 210 may include a secure area of storage. The secure area of storage may be or include a trusted execution environment (TEE). The TEE may be an area that guarantees that code and data loaded therein is protected with respect to integrity and confidentiality. For example, it may prevent unauthorized entities from altering data when any entity outside the TEE processes data. It may also prevent the code in the TEE from being replaced or modified by unauthorized entities. In at least some implementations, data stored in the secure area of storage may be secured using a device-level credential and/or biometric or using another security technique.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer system 124, point-of-sale terminal 110, customer device 150, touchless transfer server 100, and/or the transfer rail 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Where the computing device 200 is operating as the POS terminal 110, the computing device 200 may include a physical token reader. The physical token reader is configured for reading a physical token such as a value transfer card or a mobile device having a representation of a value transfer card stored thereon. The physical token reader may be or include a card slot which facilitates communication with the physical token through physical contact and/or a contactless reader such as a near field communication (NFC) reader which may facilitate communication with the physical token through communication protocols that do not rely on physical contact with the physical token.

As noted above, the computing device 200 may include one or more input modules and/or one or more output modules. For example, where the computing device 200 is operating as the POS terminal 110 it may include one or more input modules such as a touchscreen display and/or a keypad that may be configured to receive user input. Where the computing device 200 is operating as the POS terminal 110, it may also include a display module which is used for displaying a user interface that facilitates payment processing.

When the computing device 200 is operating as the customer device 150, the input modules may include a camera or scanner than may be used to scan a machine-readable code as will be explained more fully in the discussion below. The input modules may include an input module for receiving authentication data such as, for example, a biometric input, password or PIN. By way of example, the input module may include a touchscreen, fingerprint sensor, camera, key or keypad, or an input module of another type.

The input and output modules and communications module are devices and may include, for example, hardware components, circuits and/or chips.

Figure 3:
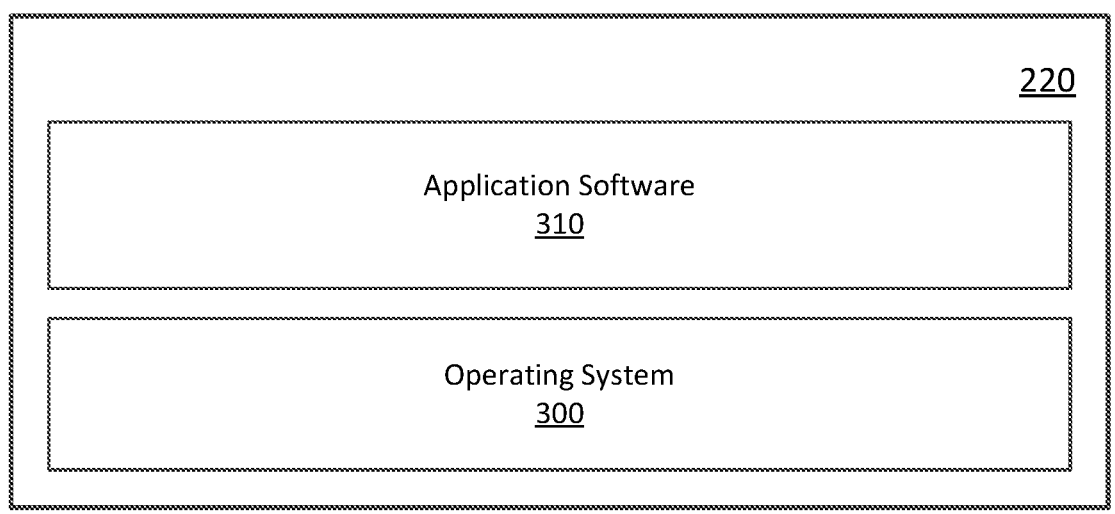
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer system 124, point-of-sale terminal 110, customer device 150, touchless transfer server 100, and/or the transfer rail 120.

While a single application software 310 is illustrated in FIG. 3, in operation the memory 220 may include more than one application software 310 and different application software 310 may perform different operations.

Where the example computing device is operating as the customer device 150, the application software 310 may be or include an issuer application. The issuer application may configure the customer device 150 to interact with the issuer system 124. The issuer application may be, for example, a transfer management application such as a banking application. The banking application may, for example, be configured to display a quantum of value in one or more data records (e.g. display balances), configure or request that operations such as transfers of value (e.g. bill payments, email money transfers and other transfers) be performed, and perform other account management functions.

Figure 4:
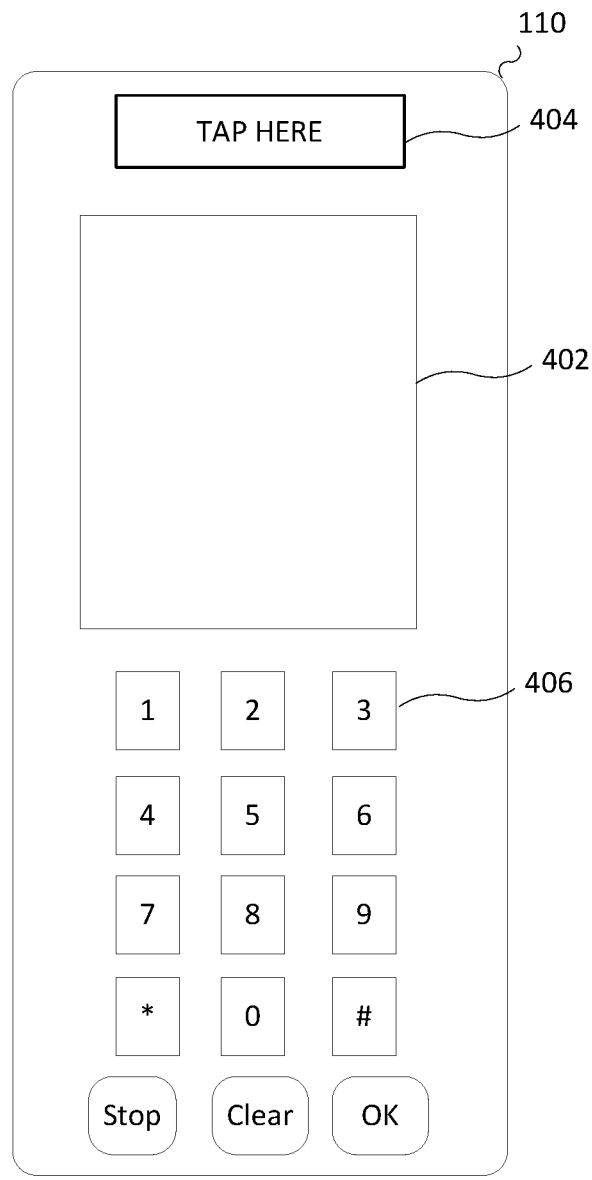
FIG. 4 shows an example point-of-sale terminal.

Referring now to FIG. 4, an example POS terminal 110 is illustrated. The POS terminal includes a physical token reader which, in the example, includes a wireless physical token reader configured for near field communications. The physical token reader may be used by tapping a physical token at a particular region 404 of the POS terminal 110. The particular region 404 is a sensing region. That is, when the physical token is placed at or near the particular region, the POS terminal 110 is able to communicate with the physical token to obtain physical token data.

The POS terminal 110 includes one or more output modules. In the example, the output modules include a display module 402. The display module 402 may, in at least some implementations, be a touchscreen display. In such cases, the display module 402 is both an output module and an input module.

The POS terminal 110 may include an input module of another type instead of or in addition to a touchscreen display. By way of example, the displayed POS terminal 110 includes a keypad 406. The input module may be used by an operator in order to setup a transaction. By way of example, the operator may input a base amount of a transaction. In some instances, the POS terminal may include or be associated with a scanner such as a bar-code reader which may be used to scan bar-codes that are displayed on tags associated with merchandise. In such instances, the operator may not input the base amount of the transaction directly; the base amount may be determined by a computer having access to price data.

By way of further example, in some instances, the POS terminal 110 may be associated with a computer system which allows an operator to input order information that may be used to calculate a base amount that is provided directly to the POS terminal 110. For example, the computer system may be a merchant terminal that may allow an operator to select items for an order from a predefined list, such as a list associated with a menu, and the merchant terminal may then calculate a base amount for a transaction and send it to the POS terminal.

The POS terminal 110 may, in some instances, include other physical token readers apart from the wireless physical token reader. For example, a card slot may be included and may be arranged so that when a value transfer card is inserted in the card slot, one or more pins or pads associated with the card may align with pads or pins provided in the POS terminal 110 that are intended for reading data from the card.

By way of further example, in some instances, the physical token readers may include a magnetic reader which is configured for reading data from a magnetic strip associated with a value transfer card.

Figure 5:
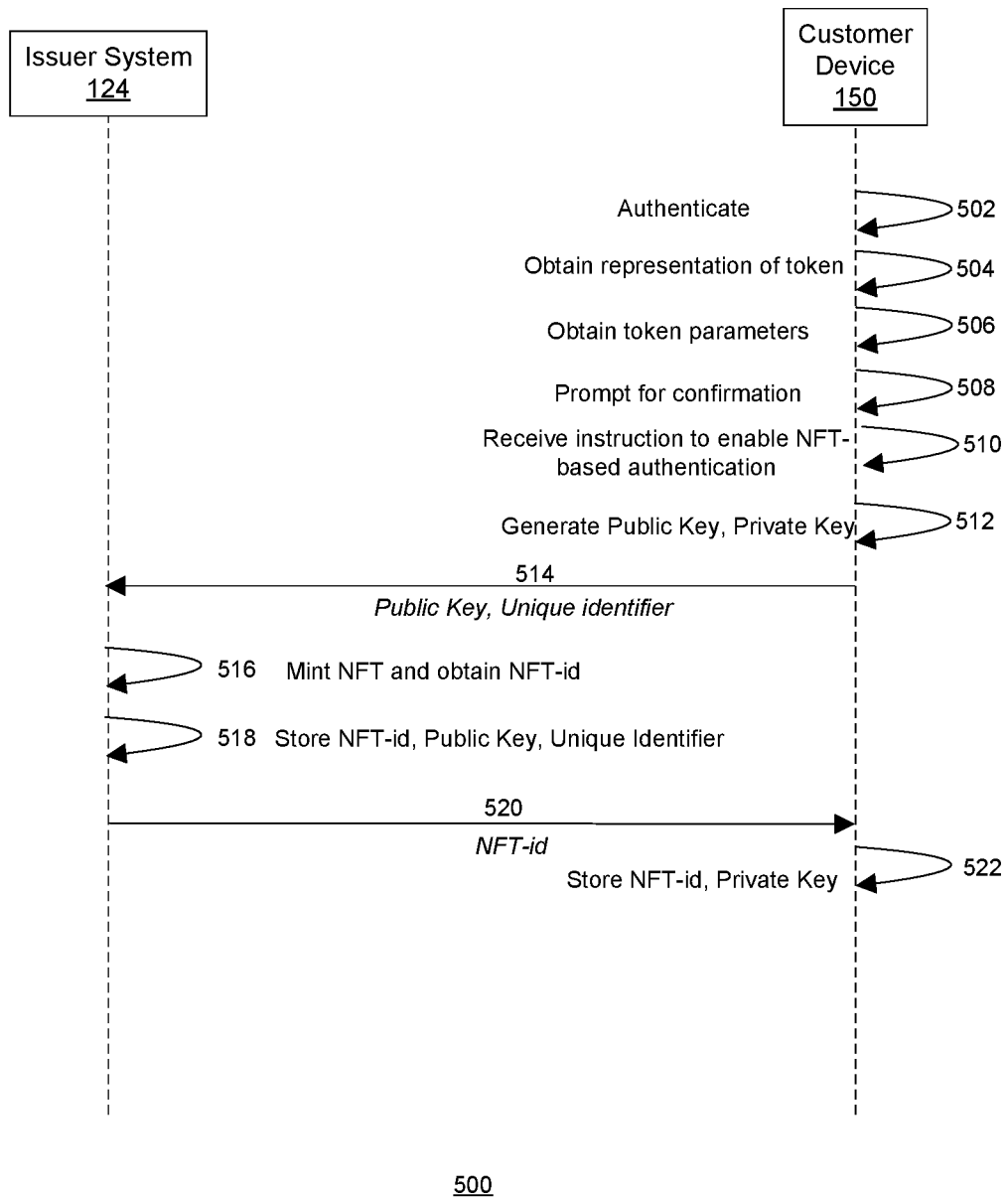
FIG. 5 shows a sequence diagram illustrating messages exchanged between systems illustrated in FIG. 1.

Reference is now made to FIG. 5. FIG. 5 illustrates a sequence diagram 500, similar to a Unified Modelling Language (UML) sequence diagram, that shows how a customer device 150 and issuer system 124 may communicate in some embodiments, and, in particular, depicting messages exchanged therebetween in provisioning or otherwise configuring the customer device 150 and/or the issuer system 124 to allow an NFT to be used as proof of account ownership.

The operations that are performed by the customer device 150 and the issuer system 124 illustrated in the sequence diagram or otherwise referred to herein, may be performed by processors executing processor-executable instructions stored in a memory. The processors may be coupled to a communications module which may be used in sending and/or receiving the various messages.

In the following description of the sequence diagram 500, discussion is made of various messages being sent and received via a computer network such as, for example, network 130. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that various message pairs illustrated in FIG. 5 correspond to an RPC or a web service API call and a reply or callback in response to that call.

The sequence diagram 500 represents a sequence that may be performed at a customer device 150 and an issuer system 124 in order to enable NFT-based authentication of a customer associated with the customer device 150. Put differently, the sequence may be a provisioning sequence which provisions a customer device 150 and/or an issuer system 124 with data to allow such devices and systems to enable NFT-based authentication of a customer following the authentication. A further sequence, such as the sequence 800 of FIG. 8, may be performed following the sequence of FIG. 5.

Each of the customer device 150 and the issuer system 124 may perform portions of the sequence and these portions or a portion thereof may be provided in a method. For example, the customer device 150 may perform a first method which includes one or more of the operations indicated in the sequence diagram 500 as being performed by the customer device and the issuer system 124 may perform one or more of the operations indicated in the sequence diagram 500 as being performed by the issuer system 124. In at least some implementations, a processor may configure one or both of the customer device and/or the issuer system 124 to perform a respective method. For example, a processor associated with the customer device 150 may execute processor-executable instructions stored in memory which configures that customer device 150 to perform such a method. Similarly, a processor associated with the issuer system 124 may execute processor-executable instructions which configures to the issuer system 124 to perform such a method.

As illustrated, at operation 502, a customer device 150 may authenticate an operator of such a device as being associated with a particular account at an issuer system 124. Such authentication may be performed based on a credential. The credential may be or include one or more of a password, personal identification number (PIN), unique identifier (such as a name or email address), or biometric data (such as a representation of a fingerprint, face, eye, etc.). In at least some implementations, the credential authenticates the customer as being associated with a particular account at the issuer system 124. It may be that the customer device 150 communicates with the issuer system 124 in performing such authentication or it may be that the customer device 150 is able to provide such authentication locally on the customer device 150.

The authentication may be performed using an issuer application running on the customer device 150. The issuer application may be an application that is associated with the issuer system 124. The authentication may be performed locally on the customer device 150 by comparing received input with a stored credential. In some implementations, at least a portion of the authentication may be performed off-device. For example, the authentication may be performed with assistance from the issuer system 124 in at least some implementations.

Next, at an operation 504, the customer device 150 may receive an instruction to commence provisioning and/or an instruction to enable NFT-based authentication. The instruction may be an instruction to allow an NFT to be used for proof of account ownership. The instruction may be received through an application associated with the issuer system 124. For example, the instruction may be received through an issuer application running on the customer device 150. For example, the issuer application may allow the customer to scan a physical token using a camera. The issuer application may, in at least some implementations, allow the customer to scan the physical token after the customer has authenticated as being associated with a particular account at the issuer system 124.

The representation of the token may be received via an input module associated with a customer device 150 such as a touchscreen display, a button or key, a microphone, a communication device such as a near field communication (NFC) device or a camera. By way of example, it may be that the customer device 150 receives the representation of the token when a customer takes a photograph of a physical token using a camera of the customer device 150. The physical token may be a value transfer card (e.g., a payment card). The physical token may be a token that has not yet been activated for any uses or that has not yet been activated for use with NFT as proof of account ownership.

The representation of the token may be received in other ways. For example, in some implementations, the customer device 150 may receive the representation of the token at 504 via input from the customer at an input interface of the customer device 150 such as a keypad, keyboard or touchscreen display. For example, the customer may input parameters such as a unique identifier such as a primary account number (PAN), an expiry date, and/or a security code, such as a Card Verification Value (CVV) code from user input.

In at least some implementations, the customer device 150 may receive an image of a physical token at operation 504, determine that the image is of a physical token that has not yet been activated to use NFT as proof of account ownership and, in response, determine that an input to commence provisioning/setup to allow an NFT to be used for proof of account ownership has been received.

Other input mechanisms associated with the customer device 150 may be used instead or in addition to the camera to receive the instruction. For example, in some instances, the instruction may be received when the customer device 150 detects that a physical token has been scanned with a communication system such as an NFC system.

The customer device 150 and/or the issuer system 124 may, at operation 506, obtain details or particulars associated with the physical token. Such details or particulars may be referred to as one or more of: token parameters, token details, account parameters, account details, account data, and token data.

For example, the issuer system 124 and/or the customer device 150 may identify a unique identifier such as a primary account number (PAN) associated with the physical token. Additionally or alternatively, the issuer system 124 and/or the customer device 150 may identify an expiry date associated with the physical token. Additionally or alternatively, the issuer system 124 may identify a security code, such as a CVV code associated with the physical token. Such data may be obtained from user input (e.g., input of particulars of the physical token by the customer at an input device such as a keyboard or touchscreen of the customer device) or it may be obtained via an image-based analysis of an image captured of the physical token. For example, optical character recognition (OCR) may be performed in order to identify such data from an image. Or, in another example, it may be that the details or particulars of the physical token are determined from a machine-readable code depicted on the physical token. By way of example, the machine-readable code may be or include a bar code or a quick response (QR) code. The bar code or QR code may map to account data such as for example, a unique identifier such as a PAN, an expiry date, and/or a CVV code. In some implementations, the bar code or QR code may encode one or more of these parameters. In some implementations, the bar code or QR code may encode an identifier that maps to account data in memory.

In another example, the details or particulars of the physical tokens may be obtained via a communication interface or system such as an NFC device or system. For example, the data may be read when the customer taps the physical token on or near the customer device 150. The customer device 150 may then read the data using Application Protocol Data Unit (APDU) commands. For example, Europay, Mastercard and Visa (EMV) standard techniques may be used to read the physical token.

In at least some implementations, in response to obtaining the representation of the physical token and/or the details or particulars of the token, the customer device 150 may, at operation 508, prompt for confirmation to enable NFT-based authentication. That is, the customer device 150 may display a message soliciting input for an instruction to confirm that NFT-based authentication is to be enabled for the token. The message may be output on the customer device 150 together with an interface element for receiving the instruction. The prompt may be output in response to detecting a particular condition. For example, in some implementations, the customer device 150 and/or the issuer system 124 may determine whether NFT-based authentication has already been enabled for the token. If so, then the prompt may not be displayed. Instead, a message indicating that NFT-based authentication has already been enabled for the token may be displayed.

While not illustrated in FIG. 5, the operation 508 may include communications with the issuer system 124. For example, the issuer system 124 may determine whether the prompt is to be displayed. In some implementations, the issuer system 124 may generate the prompt.

The customer device 150 may receive an instruction to enable NFT-based authentication at operation 510. The instruction may be received when the prompt is output. For example, the instruction may be received via an interface element included in the prompt. The instruction may be received through an input mechanism associated with the customer device 150. This input mechanism may be or include one or more of: a microphone, a camera, a sensor, a touchscreen display, or a button or key.

In response to receiving the instruction to enable NFT-based authentication at operation 510, the customer device 150 and/or the issuer system 124 may initiate provisioning for NFT-based authentication. Provisioning for NFT-based authentication may be initiated in response to other detected conditions instead of or in addition to the receipt of the instruction. For example, it may be that provisioning for NFT-based authentication is initiated in response to obtaining token parameters at operation 506 for a token that has not yet been configured for NFT-based authentication.

Provisioning for NFT-based authentication may include a number of operations and some such operations may be performed by the customer device 150 and some may be performed by the issuer system 124. During the provisioning, the customer device 150 and the issuer system 124 store data that allows NFT-based authentication to be used in the future. For example, as will be explained in further detail below, the provisioning may allow the issuer system 124 to link a unique identifier such as the identifier obtained from the physical token (e.g., a PAN) with an NFT.

The provisioning may include, for example, an operation 512. During operation 512, the customer device 150 may generate a key pair within a secure area of the customer device 150. For example, the key pair may be generated within a trusted execution environment (TEE). The key pair may be, for example, a Rivest-Shamir-Adleman (RSA) key pair or an Elliptic-curve cryptography (ECC) key pair. The key pair may include a private key and a public key.

The customer device 150 may send a message 514 to the issuer system 124 after the key pair is generated. The message 514 may be sent over a secure channel such as, for example, over a secure hyper text transfer protocol (HTTP) interface. The message 514 includes the public key. The message 514 is received in association with an account. For example, the message 514 may include the unique identifier that is associated with a particular account at the issuer system 124.

The issuer system 124 may receive, from the customer device 150, the public key that is associated with the unique identifier. The public key forms a key pair with the private key. The private key may not be shared with the issuer system 124. Rather, the private kay may be stored in the secure area of the device such as in the TEE.

At 516, the issuer system 124 uses the received public key to mint and/or create a new NFT. The NFT may be created via a public or private blockchain. By way of example, the NFT may be created using an Ethereum Request for Comments 721 (ERC-721) compliant smart contract interface. The issuer system 124 assigns ownership of the NFT to a public address which is derived from the received public key (i.e., the public key received in the message 514). This may be performed according to the Ethereum Request for Comments 20 (ERC-20) standard. The NFT token content may include various data. For example, it may include an identifier such as an NFT identifier (NFT-id) and the public blockchain address of the owner that is assigned ownership of the NFT.

As noted above, the computer system assigns ownership of the NFT to a blockchain address, such as a blockchain public address, that is derived from the public key. In this way, the computer system links the NFT to the public key and, indirectly, to the unique identifier (such as the PAN) associated with the account that is being enabled for NFT-based authentication.

While not illustrated in FIG. 5, in order to perform the operation 516, the issuer system 124 may communicate with one or more external systems. For example, the issuer system 124 may communicate with one or more nodes of the blockchain network on which the NFT is created/minted and/or on which ownership of the NFT is assigned.

The issuer system 124 stores provisioning data at operation 518. The provisioning data may be or include an NFT identifier (NFT-id), the public key received in the message 514, and an account identifier such as the unique identifier. The unique identifier may be a PAN. The provisioning data is stored in memory associated with the issuer system 124. The provisioning data associates the NFT identifier and the public key with a particular account. For example, the provisioning data may associate one or both of the public key and the NFT identifier with an account represented by or associated with the unique identifier. The provisioning data may, additionally or alternatively, associate the public key with the NFT identifier.

The issuer system 124 may send the NFT identifier (NFT-id) to the customer device 150 in a message 520. The customer device 150 receives the NFT identifier and may, at an operation 522, store its own provisioning data. This provisioning data may include the NFT-id and the private key. The provisioning data may also include other data including, for example, the public key and/or the unique identifier. The provisioning data may, for the customer device 150, be stored in a secure area of the device's memory, such as in a TEE.

After the operation 522, both the issuer system 124 and the customer device 150 store provisioning data. This provisioning data is different for the customer device 150 than for the issuer system 124 since the customer device 150 has access to and stores the private key while the issuer system 124 does not.

The secure area of memory is an area of memory that may be protected using a credential such as a PIN or passcode or biometric data which may be used as part of a facial or fingerprint scan, for example.

After respective provisioning data has been stored on each of the issuer system 124 and the customer device 150, the account has been enabled for NFT-based authentication.

The sequence 500 may be modified. For example, in at least some implementations, the token may be a digital token rather than a physical token and the sequence 500 may be modified accordingly. For example, the unique identifier may be associated with a token, such as a payment card, that is issued digitally. There may be no physical payment card and instead issuance of the token may involve the issuer system 124 sending the one or more token parameters, such as the unique identifier (e.g., PAN), expiry date, and security code (e.g., CVV) to the customer device 150 or by sending a tokenized representation of a virtual payment card to the customer device 150. Upon receiving a digital representation of the payment card, the customer device 150 may initiate the prompting (at 508) and/or may initiate the provisioning (at 512). Accordingly, the linking of the unique identifier with the NFT may be performed after or in response to the customer device 150 receiving the digital representation of the payment card or other value transfer card.

In another example of how the sequence 500 may be modified, it may be that the operations of the sequence have a different order than the order displayed in FIG. 5. For example, it may be that the prompting at the operation 508 may be performed prior to obtaining the representation of the token at 504. For example, upon receipt of the instruction to enable NFT-based authentication at operation 510, the customer device 150 may then initiate scanning for a token.

In another example, the authentication operation 502 may be performed in a different order of the sequence 500. For example, the authentication may be performed after the representation of the token has been received (at operation 504) and/or after the token parameters have been received (at operation 506) and/or after the instruction to enable NFT-based authentication has been received (at operation 510).

Each of the systems illustrated in FIG. 5 may be considered to perform an associated method. By way of example, the issuer system 124 performs a method that includes the operations described as being performed by the issuer system 124 or a portion thereof and the customer device 150 performs a method that includes the operations described as being performed by the customer device 150 or a portion thereof. A memory associated with each of these systems may include computer-executable instructions which, when executed, configure the associated system to perform the associated method, or a portion thereof.

Figure 6:
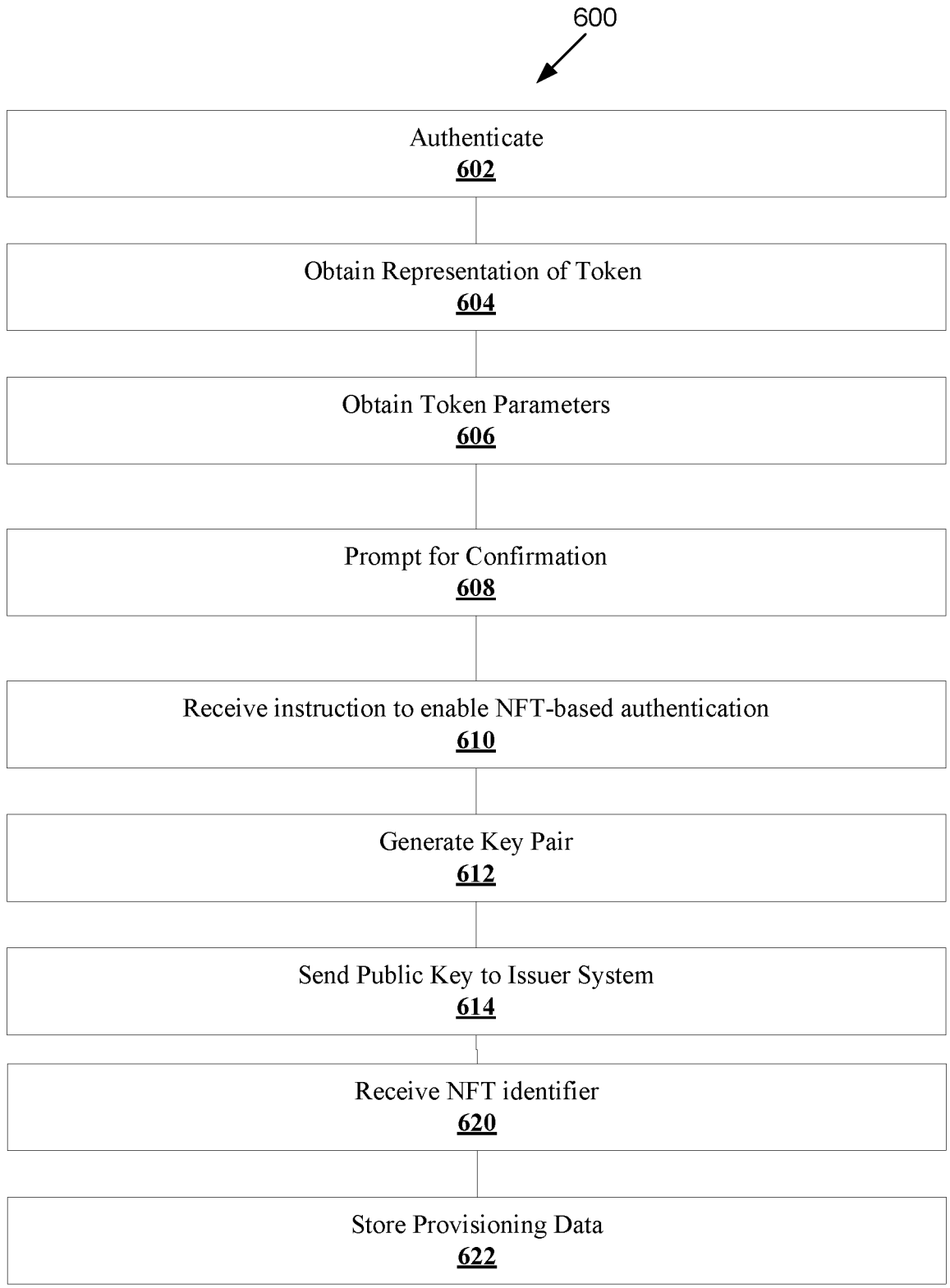
FIG. 6 illustrates, in flowchart form, an example method that may be performed by a customer device.

By way of example, reference is now made to FIG. 6, which shows, in flowchart form, an example method 600 that may be performed by a customer device 150.

Operations starting with operation 602 and continuing onward are performed by the processor 210 (FIG. 2) of a computing device 200 executing software comprising instructions such as may be stored in the memory 220 of the computing device 200. For example, the operations of the method 600 may be performed by the customer device 150, which may also be referred to as a device. More particularly, processor-executable instructions may, when executed, configure a processor 210 of the customer device 150 to perform the method 600. In some embodiments, the operations of method 600 may be performed by the customer device 150 in conjunction with one or more other computing systems, such as the issuer system 124.

The operations 602 and onward may be the same or similar to those described above with reference to sequence diagram 500 of FIG. 5 and the discussion of the operations 602 and onward will be made by reference to the operations in the sequence diagram 500.

At an operation 602, authentication may be performed in the manner described above with reference to operation 502 of the sequence diagram 500.

At an operation 604, a representation of a token may be obtained in the manner described above with reference to operation 504 of the sequence diagram 500.

At an operation 606, one or more token parameters may be obtained in the manner described above with reference to operation 506 of the sequence diagram 500.

At an operation 608, a prompt may be output on the customer device 150 as described above with reference to operation 508 of the sequence diagram 500.

At an operation 610, an instruction to enable NFT-based authentication may be obtained as described above with reference to operation 510 of the sequence diagram 500.

At an operation 612, a key pair is generated as described above with reference to operation 512 of the sequence diagram 500.

At an operation 614, a public key is sent to the issuer system 124 as described above with reference to message 514 of the sequence diagram 500.

At an operation 620, an NFT identifier may be received from the issuer system 124 as described above with reference to message 520 of the sequence diagram 500. The NFT identifier may be received as a response to a message sent at the operation 614 which included the public key.

At an operation 622, the issuer system 124 may store provisioning data as described above with reference to 522 of the sequence diagram 500.

Figure 7:
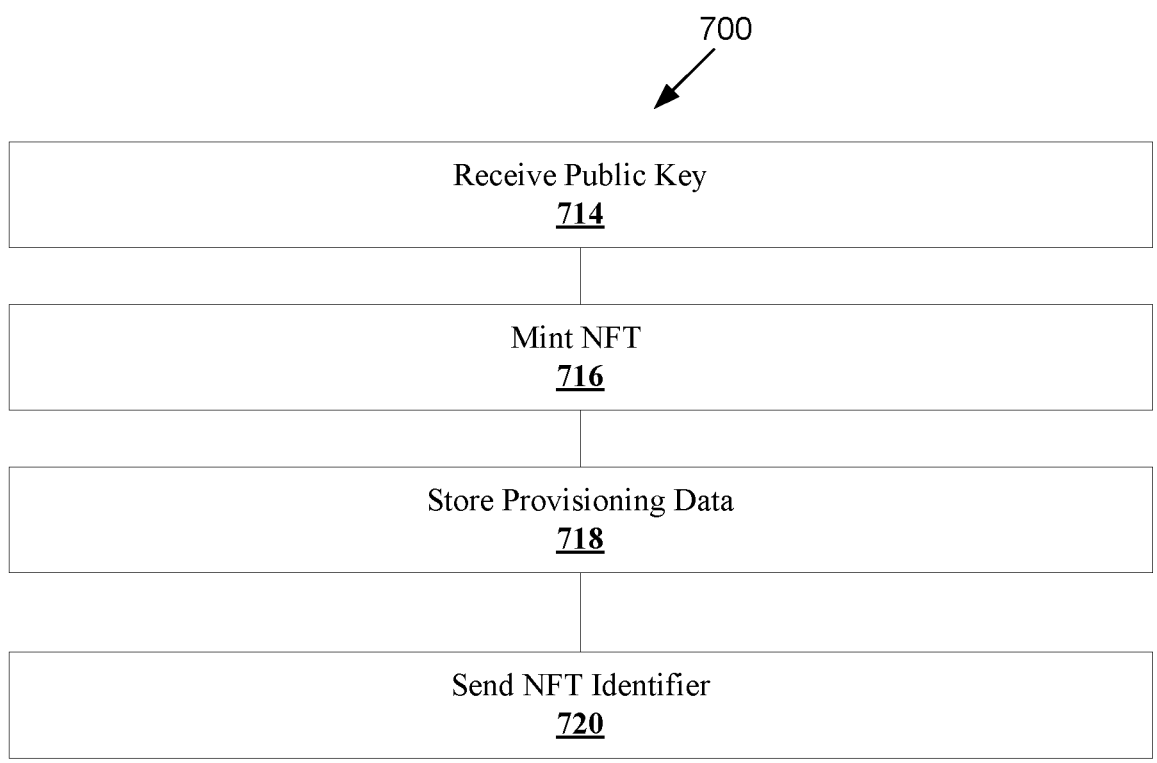
FIG. 7 illustrates, in flowchart form, an example method that may be performed by an issuer system.

Reference is now made to FIG. 7, which shows, in flowchart form, an example method 700 that may be performed by an issuer system 124.

Operations starting with operation 714 and continuing onward are performed by the processor 210 (FIG. 2) of a computing device 200 executing software comprising instructions such as may be stored in the memory 220 of the computing device 200. For example, the operations of the method 700 may be performed by the issuer system 124, which may also be referred to as a computing system. More particularly, processor-executable instructions may, when executed, configure a processor 210 of the issuer system 124 to perform the method 700. In some embodiments, the operations of method 700 may be performed by the customer device 150 in conjunction with one or more other computing systems, such as the issuer system 124.

The operations 714 and onward may be the same or similar to those described above with reference to the sequence diagram 500 of FIG. 5 and the discussion of the operations 714 and onward will be made by reference to the operations in the sequence diagram 500.

At an operation 714, the issuer system 124 receives a public key as described above with reference to 514 of the sequence diagram 500.

At an operation 716, the issuer system 124 mints an NFT as described above with reference to 516 of the sequence diagram 500. The operation 716 may be performed responsive to receipt of the public key.

At an operation 718, the issuer system 124 stores provisioning data as described above with reference to operation 518 of the sequence diagram 500.

At an operation 720, the issuer system sends the NFT identifier to the customer device 150 as described above with reference to 520 of the sequence diagram 500.

After the customer device 150 and the issuer system 124 have been provisioned for allowing NFT-based authentication, NFT-based authentication may be performed. That is, after the customer device 150 and the issuer system 124 have been provisioned to enable NFT-based authentication, NFT-based authentication may later be performed. This may, for example, allow a customer to use a physical token without having to input a shared secret such as a PIN.

Figure 8:
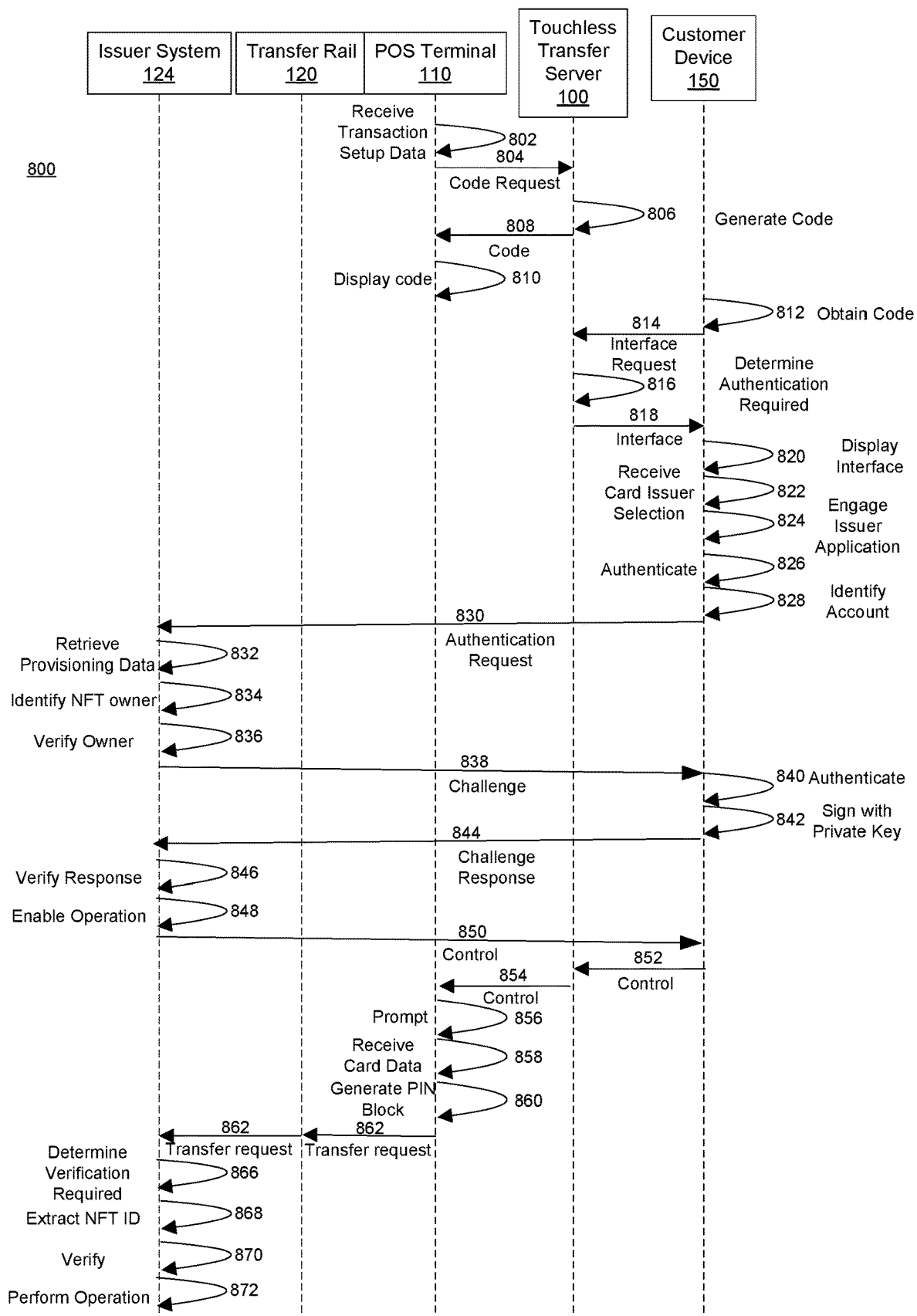
FIG. 8 shows a sequence diagram illustrating messages exchanged between systems illustrated in FIG. 1.

Reference is now made to FIG. 8. FIG. 8 illustrates a sequence diagram 800, similar to a Unified Modelling Language (UML) sequence diagram, that shows how the customer device 150, touchless transfer server 100, POS terminal 110, transfer rail 120 and the issuer system 124 may communicate in some embodiments, and, in particular, depicting messages exchanged therebetween in authenticating and/or processing a transaction. Such messages may be used for initiating a data transfer or initiating a transfer of value.

The operations that are performed by the customer device 150, touchless transfer server 100, POS terminal 110, transfer rail 120 and the issuer system 124 in exchanging the messages illustrated in the sequence diagram and/or in performing various operations referred to herein, may be performed by processors executing processor-executable instructions stored in a memory. The processors may be coupled to a communications module which may be used in sending and/or receiving the various messages.

In the following description of the sequence diagram 800, discussion is made of various messages being sent and received via a computer network such as, for example, network 130. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that various message pairs illustrated in FIG. 8 correspond to an RPC or a web service API call and a reply or callback in response to that call.

The sequence 800 may be performed after the sequence 500 of FIG. 5 and/or after one or both of the methods 600, 700 of FIGS. 6 and 7 have been performed. That is, the sequence 800 may be performed after the customer device 150 and/or the issuer system 124 have already been configured to enable NFT-based authentication.

As illustrated, at the beginning of sequence, at operation 802, the POS terminal 110 may receive transaction setup data, such as an amount of a transaction including, for example, a base amount of a transaction. The amount may be received through an input module that is configured for receiving operator input. The input module may be provided on the POS terminal or on an associated system that is communicably coupled with the POS terminal 110. By way of example, in some implementations, the amount may be received via direct input on a keypad 406 (FIG. 4) provided at the POS terminal. In other instances, another point of sale system may receive input that may be used to determine the base amount (e.g., by scanning a bar code or by selecting an item for purchase from a list of available items) and the amount may then be sent to the POS terminal 110. The amount of the transaction may be or include a base amount of the transaction. A base amount of a transaction may be an amount of a transaction that a customer is required to pay and the base amount of the transaction may exclude an optional amount (also known as a voluntary amount and/or a variable amount), such as an amount for a tip.

The POS terminal 110 may then obtain and display a machine-readable code. In some implementations, the POS terminal 110 may obtain the machine-readable code from the touchless transfer server 100. For example, the POS terminal 110 may send a message 804 to the touchless transfer server 100. The message 804 may be referred to as a code request message. The message 804 may include an indication of the amount of transaction. The message 804 may include one or more identifiers such as a point-of-sale terminal identifier and/or a merchant identifier. The message 804 may also include random data, such as a random number which may be produced by a random number generator.

The touchless transfer server 100 receives the message 804 which includes the base amount of the transaction. In response to receiving the message 804, the touchless transfer server 100 generates a machine-readable code (at operation 806) based on the contents of the message 804.

The machine-readable code may, in some implementations, be a quick response (QR) code. The machine-readable code may encode various data. For example, the machine-readable code may encode the base amount of the transaction. The machine-readable code may encode a transaction identifier. The machine-readable code may encode a point-of-sale terminal identifier and/or a merchant identifier. The machine-readable code may include random data such as the random data provided in the message 804.

The machine-readable code may encode a link such as, for example, a web address. The web address is an address associated with a web server that is provided by or is associated with the touchless transfer server 100. The web address may be a uniform resource locator (URL). The web address may be associated with an interface. That is, the web address may be an address for a web server that serves the interface to a device that has scanned the machine-readable code.

The machine-readable code may encode security or verification data. For example, the machine-readable code may encode a hash. The touchless transfer server 100 may generate the hash based on other data encoded in the machine-readable code. For example, the hash may be generated based on any one or a combination of: the link/web address, the base amount of the transaction, the point-of-sale terminal identifier and/or a merchant identifier, the transaction identifier and/or the random data.

The machine-readable code may be digitally signed by the touchless transfer server 100 and/or may encode a digital signature.

In some implementations, at least some of the data that is encoded in the machine-readable code may be encoded as parameters associated with the web address that is encoded in the machine-readable code. For example, any one or a combination of: the hash, the base amount of the transaction, the point-of-sale terminal identifier, the merchant identifier, the transaction identifier, the random data and/or the digital signature may be encoded as parameters, such as URL parameters, for the URL. Conveniently, in this way, when a customer scans the machine-readable code with a customer device 150, the customer device 150 may be directed to the web address associated with the touchless transfer server 100 and may pass the web address such data as parameters.

The touchless transfer server 100 may, after preparing the machine-readable code, send a message 808 to the POS terminal 110. The message 808 includes the machine-readable code. In sending the machine-readable code to the POS terminal 110, the touchless transfer server 100 causes the machine-readable code to be displayed at the POS terminal 110. The POS terminal 110 receives the message 808 and, in doing so, receives the machine-readable code. The POS terminal 110 may, at operation 810, display the machine-readable code at a display module 402 (FIG. 4) associated with the POS terminal 110.

A customer may then scan or read the machine-readable code using a customer device 150. A customer may point a camera or other scanner associated with the customer device 150 at the displayed machine-readable code while a reader application is enabled on the customer device 150. The customer device 150 at operation 812 obtains a representation of the machine-readable code. That is, the reader application may decode the machine-readable code in order to obtain data contained therein. In doing so, the reader application may identify the web address included in the machine-readable code. The reader application may then provide a selectable option to activate the web address or it may automatically activate the web address.

The customer device 150 which scanned the machine-readable code, may then send a message 814 to the touchless transfer server 100. The message may be a request to retrieve content and, more particularly, a request to retrieve an interface. The request may be in the form of an HTTP GET in some implementations. The request may be sent by a web browser associated with the customer device 150 in at least some implementations. For example, the reader application may pass a URL and any associated URL parameters decoded from the machine-readable code to the web browser which then uses the URL, complete with any parameters, to retrieve the interface.

The touchless transfer server 100 receives the message 814. That is, the touchless transfer server 100 receives a request from the customer device 150 for the interface and receives any data that may be passed to the touchless transfer server 100 as, for example, URL parameters. Accordingly, the request received at the touchless transfer server 100 may reference any one or a combination of: the base amount of the transaction, the transaction identifier, the hash, the digital signature, the random data, the point-of-sale identifier, and/or the merchant identifier.

In some implementations, in response to receiving the message 814, the touchless transfer server 100 may verify the message 814. That is, the touchless transfer server 100 may verify the request. Such verification may be based on the hash, the digital signature and/or the random data. The verification may, for example, ensure that the request is not associated with a replay attack, that the data has not been tampered with and/or that the request was generated based on an authorized machine-readable code. The verification that the request was generated based on an authorized machine-readable code may be based on the digital signature. That is, the touchless transfer server 100 may verify that the signature is a valid signature. The verification that the request was not associated with a replay attack may rely on the random data. The hash may be used to verify that the data has not been tampered with.

After the touchless transfer server 100 verifies the request and, in response to receiving the request, the touchless transfer server may cause the device that scanned the machine-readable code to output an interface. For example, the touchless transfer server 100 may send a message 818 to the customer device 150. The message may include the interface. The interface may be displayed by the customer device 150 at operation 820

The interface may be a web page and may be displayed in a web browser on the customer device 150.

In some implementations, the interface may take a different form depending on whether or not authentication of a customer as being associated with an account is required. Whether authentication is required may be determined at operation 816 by the touchless transfer server 100. In some instances, the determination of whether authentication is required may consider the amount of the transaction. Transactions for an amount of value that is less than a threshold may not require authentication but transactions that are for an amount of value that is greater than the threshold may require authentication. Accordingly, the operation 816 may involve a comparison of the amount of the transaction to a threshold. The threshold may be, for example, $200.

When the transaction is for an amount that exceeds the threshold, the interface may be configured to allow for authentication using NFT. Where the transaction is for an amount that is less than the threshold, the interface may not allow for authentication using NFT, since no authentication is required.

The interface may include other features instead of or in addition to allowing NFT-based authentication. For example, the interface may allow for input of an optional amount, such as a tip. Where a tip is input using the interface, the touchless transfer server may re-evaluate whether the amount of the transaction exceeds the threshold and it may adjust the interface to include the NFT-based authentication features if the threshold amount is exceeded. While not illustrated in FIG. 8, the customer device 150 may communicate such inputs to the touchless transfer server which may further communicate such inputs to the POS terminal 110.

If authentication is determined to be required, the interface may include one or more selectable participating card issuers. The customer device 150 may receive a selection of one of the issuers at operation 822.

After a particular issuer is selected, the customer device 150 may engage an associated issuer application at operation 824. The issuer application may be an application that is associated with the selected issuer. The issuer application may be an application stored in memory of the customer device 150. The issuer application may be engaged through deep linking. For example, the issuer application may be configured as the handler of a deep linking URL that is engaged when that issuer is selected from the interface.

When the issuer application is engaged, it interprets the engagement as an authentication request. That is, it interprets the engagement as a request to authenticate a customer as being associated with a particular account using NFT-based authentication. The issuer application may interpret the engagement in this manner through the deep linking. That is, the deep linking provides the issuer application with the context of the request.

When the issuer application is engaged, authentication may be performed at an operation 826. The authentication may be performed as described above with reference to operation 502 of the sequence 500 of FIG. 5. The authentication may be performed based on one or more of a credential, PIN, password, fingerprint, facial profile, shared secret, etc.

After authentication, the issuer application may establish a secure connection to the issuer system 124.

The customer device 150 may, at operation 828, identify an account that the customer wishes to authenticate as being associated with the customer. The account may be, for example, associated with a particular token such as a particular value transfer card. In some implementations, at operation 828, the issuer application may cause the customer device 150 to output a list of available accounts and a particular one of the accounts may be identified based on received user input.

In response to receiving an authentication request and, in a least some implementations, an identification of an account, the customer device 150 sends a message 830 to the issuer system 124. The message is or includes an authentication request. The authentication request may include a unique identifier. The unique identifier may be an identifier associated with the identified account. That is, the unique identifier may be an identifier that identifies an account associated with the authentication request.

The authentication request is received at the issuer system 124. The authentication request is received from the customer device 150 in response to the customer device scanning a machine-readable code displayed on the point-of-sale terminal. That is, the display of the code allows the authentication request to be issued from the customer device 150 to the issuer system 124.

Following receipt of the authentication request, the issuer system 124 may perform one or more operations in order to authenticate the authentication request. That is, the issuer system 124 may perform operations together with the customer device 150 to confirm that the customer is, in fact, associated with the account.

For example, at an operation 832, the issuer system 124 may retrieve provisioning data. The provisioning data may be retrieved from memory associated with the issuer system 124. The provisioning data may be or include an NFT identifier and a public key. The NFT identifier and the public key may be retrieved based on the unique identifier associated with the account. For example, the unique identifier may be included in the authentication request in the message 830. Put differently, the issuer system 124 retrieves the NFT identifier and the public key associated with the identified account (as identified at operation 828).

At an operation 834, the issuer system 124 identifies the owner of the NFT represented by the provisioning data. That is, the issuer system 124 identifies the blockchain address that is the owner of the NFT represented by the NFT identifier retrieved at the operation 832. This may be performed by obtaining, from the blockchain, the public address that owns the NFT token identifier by the NFT identifier. In some implementations, the issuer system 124 may identify the owner from a blockchain ERC-721 smart contract. For example, the issuer system 124 may invoke the "ownerOf" method and provide the NFT identifier to the ERC-721 smart contract which may then return the blockchain address that is the owner of the NFT.

While not illustrated in FIG. 8, in order to perform the operation 834, the issuer system 124 may communicate with one or more external systems. For example, the issuer system 124 may communicate with one or more nodes of the blockchain network on which the NFT was created/minted and/or on which ownership of the NFT is assigned.

After identifying the blockchain address that is the owner of the NFT, the issuer system 124 may verify that the blockchain address that is the owner of the NFT is associated with the public key that is associated with the unique identifier. This verification may be performed based on the provisioning data. For example, the issuer system 124 may verify that the blockchain address that was identified at the operation 834 (e.g., that was returned by the blockchain smart contract) is derived from the public key that is represented in the provisioning data and that is associated with the NFT identifier.

The issuer system 124 may then perform operations to verify that the private key stored in the secure area of the customer device 150 is associated with the public key represented in the provisioning data and associated with the unique identifier included in the authentication request represented by the message 830. For example, the issuer system 124 may send a message 838 to the customer device 150.

The message 838 may be or include a challenge message. The challenge message 838 may be sent as a return or reply message to the message 830 sent from the customer device 150 to the issuer system 125. That is, the challenge message may be a reply to the authentication request.

The challenge message may be a challenge to the customer device 150 to provide proof of ownership. For example, the challenge message may be a request to provide cryptographic proof of ownership. This challenge message and the operation which follow may allow the issuer system 124 to confirm that the customer owns the customer device 150 which stores the private key (inside of the customer device's secure area of memory such as inside the TEE), and that the private key is related to the public key, which may have been already confirmed to be linked to the blockchain public address owning the NFT associated with the NFT identifier.

The challenge message may include the NFT identifier. The challenge message may also include a further challenge, which may be a random challenge or "salt".

In response to receiving the challenge message, the customer device 150 may access the secure area of memory. For example, the customer device 150 may access the TEE secure enclave. Such access may be performed via a mobile platform specific software development kit (SDK).

In order to access the secure area of memory, the customer device may authenticate the customer at an operation 840. The authentication may be performed based on one or more of a credential, PIN, password, biometric, fingerprint, facial profile, shared secret, or based on another type of authentication criteria. The authentication may be performed on device. That is, the authentication may be a device-level authentication. This may be contrasted with the authentication performed at the operation 826 which may be an application-level authentication. The authentication at the operation 840 is performed to allow the customer device 150 to access the secure area of memory.

After the authentication has been performed to gain access to the secure area of memory, the customer device 150 may access the provisioning data in the secure area of memory. More specifically, the issuer application may instruct the TEE to use the private key, which may be associated with the challenge (e.g., which is associated with the NFT identifier included in the message 838), to generate a signature based on contents of the challenge message 838. For example, the issuer application may instruct the TEE to use the private key to sign the random challenge or "salt" included in the challenge message 838 at an operation 842.

The customer device 150 may send the signature to the issuer system 124 in a message 844, which may be referred to as a challenge response message. The challenge response message may include other data in addition to the signature. For example, the NFT identifier may be included.

The issuer system 124 receives the challenge response message 844 and, more specifically, the signature. The issuer system 124 then verifies the response at an operation 846. More specifically, the issuer system 124 verifies the signature using the public key that is stored in the provisioning data in association with the NFT identifier. The issuer system 124 verifies that the signature was generated using the private key that forms a key paid with the public key. After this verification, it has been effectively proven that the customer owns the private key that is related to the public key. At this point, the authentication request received in the message 830 may be said to have been authenticated.

After the authentication request has been authentication (e.g., after the verification has been successfully performed at the operation 846), the issuer system 124 enables, at an operation 848, an operation that was not available and not enabled prior to authenticating the authentication request. That is, the operation that is enabled is an operation that was not able to be performed prior to verification of the signature.

If the verification at the operation 846 were to fail or if the response message 844 was not received, the issuer system 124 would not perform the operation 848 so that the operation remains disabled/unavailable. The verification operation may be said to fail if the issuer system determines that the signature was not generated using the private key associated with the stored public key. Additionally or alternatively, the verification operation may be said to fail if the issuer system is unable to determine that the signature was generated using the private key associated with the stored public key.

In some instances, the operation 848 may enable an account operation. For example, the operation 848 may enable a login to an account. In some implementations, the operation 848 may enable a transaction to be performed that could not have been performed in the same manner prior to the operation 848. For example, it may be that the unique identifier is an identifier associated with a payment account, such as a primary account number (PAN) for a payment credential. In at least some such implementations, enabling the operation (at operation 848) may enable completion of a transaction at a POS terminal 110 using the payment credential. The payment credential may be, for example, a value transfer card such as a payment card. In some implementations, the value transfer card may be a virtual value transfer card that is issued digitally.

In some implementations, at the operation 848, the issuer system 124 may set a flag. For example, the issuer system 124 may set an authentication flag associated with the NFT identifier. The issuer system 124 may set the authentication flag to indicate that the authentication request has been authenticated. This authentication flag may be a CVM (cardholder/customer verification method) success flag which indicates that the customer has already been authenticated. The authentication flag may, in some instances, be associated with an identifier such as the NFT identifier.

The issuer system 124 may return control to the touchless transfer server 100 by sending a message 850 to the customer device 150 which may then send a message 852 to the touchless transfer server 100. These messages may transfer control to the touchless transfer server 100. The touchless transfer server 100 receives the message 852 and it may send a message 854 to the POS terminal 110. This message 854 may further transfer control to the POS terminal 110. One or more of the messages that transfer control may pass along an identifier that is linked to the authentication flag. For example, the messages 850, 852, 854 may pass the NFT identifier to the POS terminal 110. This identifier may be transferred in one or more of these messages in an encrypted format. For example, the NFT identifier may be encrypted by the issuer system 124 or the customer device 150 using a public encryption key associated with the touchless transfer server 100. The touchless transfer server may decrypt the encrypted identifier using an associated private encryption key before sending the identifier to the POS terminal 110 in the message 854.

Accordingly, one or more of the issuer system 124, the customer device 150 and the touchless transfer server 100 may send the NFT identifier to the POS terminal 110. The POS terminal 110 may, in at least some implementations, use the identifier, such as the NFT identifier, to generate a PIN block. For example, the POS terminal may be configured to generate a PIN block for a transaction message (which may also be referred to as a transfer request) based on the NFT identifier. Since the NFT identifier may be 8 bytes long, it will fit well with the existing standard algorithm to produce an ISO 8583 PIN block. This allows the NFT identifier to be transparently transported through existing transfer rails. That is, the transfer rail may not be able to distinguish transfer requests that include an NFT-based PIN block from transfer requests that include regular PIN blocks.

At an operation 856, the POS terminal 110 may generate a prompt for input of card data. Card data may be input by tapping a physical token at a physical token reader which associated with the POS terminal which may read the card data wirelessly or the card data may be captured in another manner. For example, a magnetic strip may be read, the card data may be input manually, or an image of the card may be captured and card data identified using character recognition techniques.

At operation 858, the POS terminal receives the card data. The card data may include, for example, the unique identifier. The card data may include other data such as, for example, an expiry date and/or a security code and/or a name associated with a physical token.

The card data may also be referred to as physical token data or token data.

At an operation 860, the POS terminal 110 generates a PIN block based on the identifier included in the message 854; for example, the NFT identifier. The PIN block may be an ISO 8583 PIN block or a suitable variation of such a PIN block. The PIN block may be generated by applying one of the standard PIN block ISO 9564 algorithms to the identifier.

The POS terminal 110 then sends a transfer request message 862 to the issuer system 124. The transfer request message 862 may be sent via the transfer rail 120. The transfer request message 862 includes at least some of the card data or data generated from such card data. The transfer request message 862 includes the PIN block. The transfer request message may be an ISO 8583 message or a suitable variation thereof.

The issuer system 124 receives the transfer request message 862 and it may determine, at an operation 866, that verification is required. The determination may be made by comparing a value amount defined in the transfer request message 862 to a threshold, such as a contactless limit threshold.

The issuer system may then perform verification using the PIN block. Specifically, the issuer system 124 may extract the identifier that was used to generate the PIN block at operation 868. The identifier may be extracted from the PIN block. The identifier may be extracted using the same ISO 9564 standard algorithm that was used to produce the PIN block.

The issuer system may use the extracted identifier to retrieve an authentication flag associated with the identifier. For example, at operation 870, the issuer system 124 may determine whether an authentication flag associated with that identifier has been set to indicate that an authentication request has been authenticated. That is, the issuer system 124 determines that an authentication flag associated with the NFT identifier or other identifier represented by the PIN block for the received transaction message has been set to indicate that an authentication request has been authenticated.

Next, at an operation 872, when the issuer system 124 verifies that NFT-based authentication was successfully performed, it may perform an operation such as initiating the requested transfer. This may include a number of operations, including one or more of: updating a ledger or other record to indicate that a transfer has been made and sending a message to the POS terminal to indicate that the transfer has been approved and/or has been successful.

The techniques described above can be used for authentication without use of a PIN. This may allow customers to avoid the friction associated with having to remember and input a PIN. Further, the techniques described herein may allow, for example, PAN ownership to be transferred to another party on a temporary basis. For example, a parent may transfer PAN ownership to a child on a temporary basis to allow the child to use their payment card.

It is also contemplated that the techniques described above could be extended to other implementations apart from POS implementations. For example, such techniques may be extended to ecommerce. The techniques could also be used in non-payment authentication scenarios.

Further, the techniques could be extended to provide a payment card that does not include any PIN. A user could be digitally sent a card which would then be loaded into a mobile wallet. The card may, for example, be sent via a text message. When the card arrives, it may be loaded into the wallet and the techniques described above could be used to link it to an NFC-id. This approach of digitally issuing a card could also be used without the NFC techniques. For example, in some instances, the customer could obtain a one time password (OTP) or could send a confirmation to a social media account to provide confirmation of their identity when attempting to use the digitally-issued card.

The operations described in the sequence diagrams 500, 800 may be modified. For example, some operations may be varied, modified or omitted. Further, some operations may be performed by other systems apart from the indicated systems. By way of example, some operations that are indicated as being performed by the POS terminal 110 may be performed by back-end infrastructure associated with the POS terminal and some may be performed by front-end infrastructure.

By way of further example, it may be that the authentication flag is modified or deleted after expiration of a time period. For example, the authentication flag may be deleted or modified to indicate that the authorization request has not been authenticated after expiration of a time period.

Each of the systems illustrated in FIG. 8 may be considered to perform an associated method. By way of example, the issuer system 124 performs a method that includes the operations described as being performed by the issuer system 124. The customer device 150 performs a method that includes the operations described as being performed by the customer device 150 or a portion thereof. The touchless transfer server 100 performs a method that includes the operations described as being performed by the touchless transfer server 100 or a portion thereof. The POS terminal 110 performs a method that includes the operations described as being performed by the POS terminal 110 or a portion thereof. The transfer rail 120 performs a method that includes the operations described as being performed by the transfer rail 120 or a portion thereof. A memory associated with each of these systems may include computer-executable instructions which, when executed, configure the associated system to perform the associated method, or a portion thereof.

Figure 9:
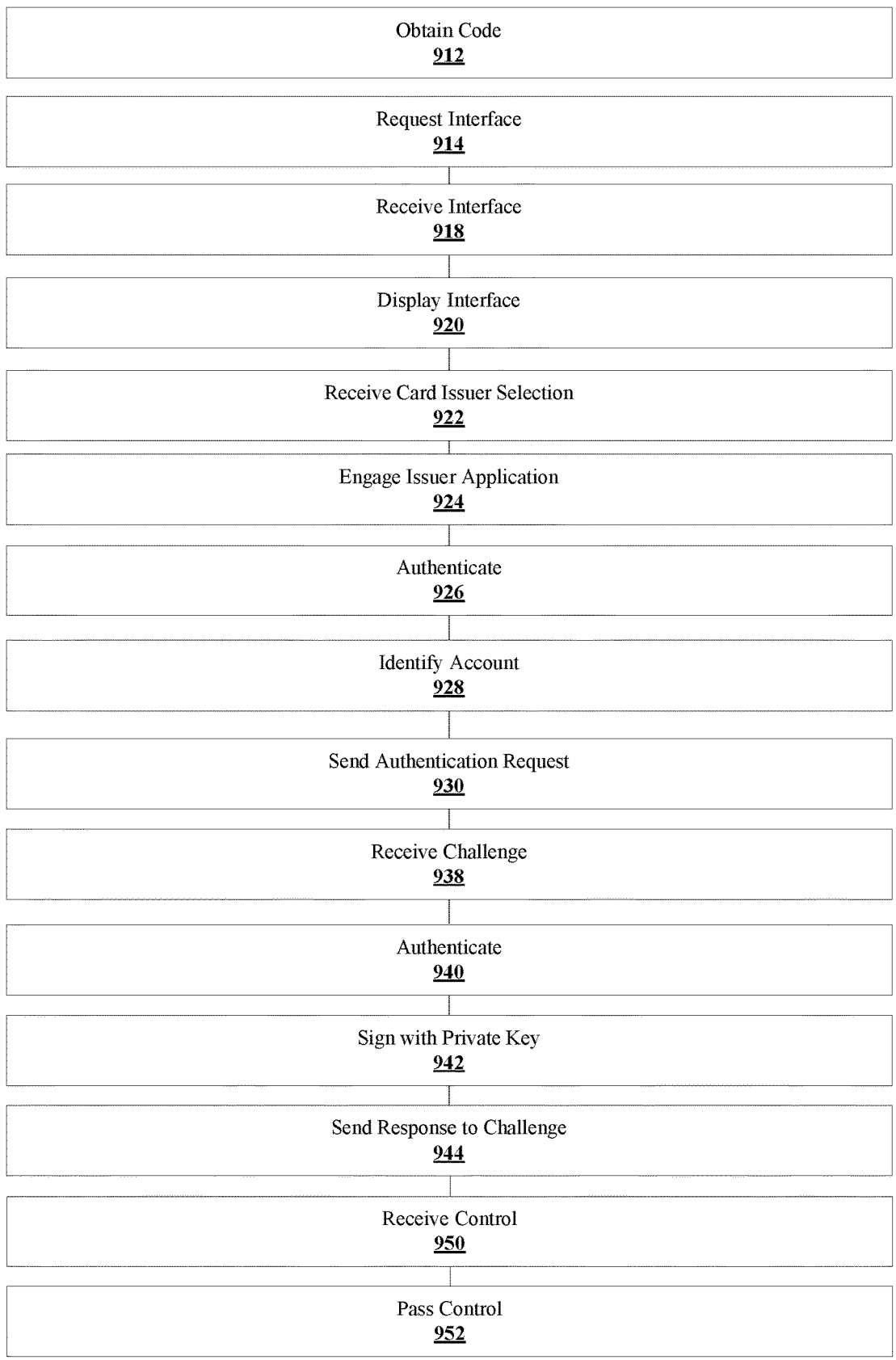
FIG. 9 illustrates, in flowchart form, an example method that may be performed by a customer device.

By way of example, reference is now made to FIG. 9, which shows, in flowchart form, an example method 900 that may be performed by a customer device 150.

Operations starting with operation 912 and continuing onward are performed by the processor 210 (FIG. 2) of a computing device 200 executing software comprising instructions such as may be stored in the memory 220 of the computing device 200. For example, the operations of the method 900 may be performed by the customer device 150, which may also be referred to as a device. More particularly, processor-executable instructions may, when executed, configure a processor 210 of the customer device 150 to perform the method 900. In some embodiments, the operations of method 900 may be performed by the customer device 150 in conjunction with one or more other computing systems, such as the issuer system 124, the touchless transfer server 100, the POS terminal 110 and/or the transfer rail 120.

The operations 912 and onward may be the same or similar to those described above with reference to the sequence diagram 800 of FIG. 8 and the discussion of the operations 912 and onward will be made by reference to the operations in the sequence diagram 800.

At an operation 912, the customer device 150 may obtain a code in the manner described above with reference to operation 812 of the sequence diagram 800.

At an operation 914, the customer device 150 may request an interface in the manner described above with reference to 814 of the sequence diagram 800.

At an operation 918, the customer device 150 may receive the requested interface as described above with reference to 818 of the sequence diagram 800.

At an operation 920, the customer device 150 may display the requested interface as described above with reference to operation 820 of the sequence diagram 800.

At an operation 922, the customer device 150 may receive a selection of a card issuer as described above with reference to operation 822 of the sequence diagram 800.

At an operation 924, the customer device 150 may engage the issuer application as described above with reference to operation 824 of the sequence diagram 800.

At an operation 926, the customer device 150 may authenticate as described above with reference to 826 of the sequence diagram 800.

At an operation 928, the customer device 150 may identify an account as described above with reference to operation 828 of the sequence diagram 800.

At an operation 930, the customer device 150 may send an authentication request to the issuer system 124 as described above with reference to 830 of the sequence diagram 800.

At an operation 938, the customer device 150 may receive a challenge from the issuer system 124 as described above with reference to 838 of the sequence diagram 800.

At an operation 940, the customer device 150 may authenticate the operator of the customer device as described above with reference to 840 of the sequence diagram 800.

At an operation 942, the customer device 150 may sign the challenge as described above with reference to 842 of the sequence diagram 800.

At an operation 944, the customer device 150 may send a response to the challenge as described above with reference to 844 of the sequence diagram 800.

At an operation 950, the customer device 150 may receive a control message as described above with reference to 850 of the sequence diagram 800.

At an operation 952, the customer device 150 may pass control to the POS terminal 110 via the touchless transfer server 100 as described above with reference to 852 of the sequence diagram 800.

Figure 10:
FIG. 10 illustrates, in flowchart form, an example method that may be performed by an issuer system.

Reference is now made to FIG. 10, which shows, in flowchart form, an example method 1000 that may be performed by an issuer system 124.

Operations starting with operation 1030 and continuing onward are performed by the processor 210 (FIG. 2) of a computing device 200 executing software comprising instructions such as may be stored in the memory 220 of the computing device 200. For example, the operations of the method 1000 may be performed by the issuer system 124, which may also be referred to as a system or a computing system. More particularly, processor-executable instructions may, when executed, configure a processor 210 of the issuer system 124 to perform the method 1000. In some embodiments, the operations of method 1000 may be performed by the issuer system 124 in conjunction with one or more other computing systems, such as the customer device 150, the touchless transfer server 100, the POS terminal 110 and/or the transfer rail 120.

The operations 1030 and onward may be the same or similar to those described above with reference to the sequence diagram 800 of FIG. 8 and the discussion of the operations 1030 and onward will be made by reference to the operations in the sequence diagram 800.

At an operation 1030, the issuer system 124 may receive an authentication request from a customer device 150 as described above with reference to 830 of the sequence diagram 800.

At an operation 1032, the issuer system 124 may retrieve provisioning data as described above with reference to 832 of the sequence diagram 800.

At an operation 1034, the issuer system 124 may identify an owner of the NFT represented in the provisioning data as described above with reference to 834 of the sequence diagram 800.

At an operation 1036, the issuer system 124 may verify the owner of the NFT as described above with reference to operation 836 of the sequence diagram 800.

At an operation 1038, the issuer system 124 may send a challenge to the customer device 150 as described above with reference to 838 of the sequence diagram 800.

At an operation 1044, the issuer system 124 may receive a response to the challenge from the customer device 150 as described above with reference to 844 of the sequence diagram 800.

At an operation 1046, the issuer system 124 may verify the response to the challenge as described above with reference to 846 of the sequence diagram 800.

At an operation 1048, the issuer system 124 may enable an operation not already enabled as described above with reference to 848 of the sequence diagram 800.

At an operation 1050, the issuer system 124 may pass control to the customer device 150 as described above with reference to 850 of the sequence diagram 800.

At an operation 1062, the issuer system 124 may receive a transfer request from a POS terminal as described above with reference to 862 of the sequence diagram 800.

At an operation 1066, the issuer system 124 may determine, based on the transfer request, that verification is required. Operation 1066 may be performed, as described above with reference to 866 of the sequence diagram 800.

At an operation 1068, the issuer system 124 may extract an identifier from the transfer request as described above with reference to 868 of the sequence diagram 800.

At an operation 1070, the issuer system 124 may verify the identifier, as described above with reference to 870 of the sequence diagram 800.

At an operation 1072, the issuer system 124 may perform an operation, as described above with reference to 872 of the sequence diagram 800.

Figure 11:
FIG. 11 illustrates, in flowchart form, an example method that may be performed by a server.

Reference is now made to FIG. 11, which shows, in flowchart form, an example method 1100 that may be performed by a touchless transfer server 100.

Operations starting with operation 1104 and continuing onward are performed by the processor 210 (FIG. 2) of a computing device 200 executing software comprising instructions such as may be stored in the memory 220 of the computing device 200. For example, the operations of the method 1100 may be performed by the touchless transfer server 100, which may also be referred to as a system or a computing system. More particularly, processor-executable instructions may, when executed, configure a processor 210 of the touchless transfer server 100 to perform the method 1100. In some embodiments, the operations of method 1100 may be performed by the touchless transfer server 100 in conjunction with one or more other computing systems, such as the customer device 150, the issuer system 124, the POS terminal 110 and/or the transfer rail 120.

The operations 1104 and onward may be the same or similar to those described above with reference to the sequence diagram 800 of FIG. 8 and the discussion of the operations 1104 and onward will be made by reference to the operations in the sequence diagram 800.

At an operation 1104, the touchless transfer server 100 may receive a code request from a POS terminal 110 as described above with reference to 804 of the sequence diagram 800.

At an operation 1106, the touchless transfer server 100 may generate a code, as described above with reference to operation 806 of the sequence diagram 800.

At an operation 1108, the touchless transfer server 100 may provide the generated code to the POS terminal 110 as described above with reference to 808 of the sequence diagram 800.

At an operation 1114, the touchless transfer server 100 may receive an interface request from a customer device 150 as described above with reference to 814 of the sequence diagram 800.

At an operation 1116, the touchless transfer server 100 may determine that authentication is required as described above with reference to 816 of the sequence diagram 800.

At an operation 1118, the touchless transfer server 100 may provide an interface to the customer device 150 as described above with reference to 818 of the sequence diagram 800.

At an operation 1152, the touchless transfer server 100 may receive a control message, as described above with reference to 852 of the sequence diagram 800.

At an operation 1154, the touchless transfer server 100 may pass control to the POS terminal 110 as described above with reference to 854 of the sequence diagram 800.

Figure 12:
FIG. 12 illustrates, in flowchart form, an example method that may be performed by a point-of-sale terminal.

Reference is now made to FIG. 12, which shows, in flowchart form, an example method 1200 that may be performed by a POS terminal 110.

Operations starting with operation 1202 and continuing onward are performed by the processor 210 (FIG. 2) of a computing device 200 executing software comprising instructions such as may be stored in the memory 220 of the computing device 200. For example, the operations of the method 1200 may be performed by the POS terminal 110, which may also be referred to as a system or a computing system. More particularly, processor-executable instructions may, when executed, configure a processor 210 of the POS terminal 110 to perform the method 1200. In some embodiments, the operations of method 1200 may be performed by the POS terminal 110 in conjunction with one or more other computing systems, such as the customer device 150, the issuer system 124, the touchless transfer server 100 and/or the transfer rail 120.

The operations 1202 and onward may be the same or similar to those described above with reference to the sequence diagram 800 of FIG. 8 and the discussion of the operations 1202 and onward will be made by reference to the operations in the sequence diagram 800.

At an operation 1202, the POS terminal 110 may receive transaction setup data as described above with reference to operation 802 of the sequence diagram 800.

At an operation 1204, the POS terminal 110 may send a code request to the touchless transfer server 100 as described above with reference to 804 of the sequence diagram 800.

At an operation 1208, the POS terminal 110 may obtain a code from the touchless transfer server 100 as described above with reference to 808 of the sequence diagram 800.

At an operation 1210, the POS terminal 110 may display the code as described above with reference to operation 810 of the sequence diagram 800.

At an operation 1254, the POS terminal 110 may receive a control message as described above with reference to 854 of the sequence diagram 800.

At an operation 1256, the POS terminal 110 may output a prompt for card data as described above with reference to 856 of the sequence diagram 800.

At an operation 1258, the POS terminal 110 may receive card data as described above with reference to 858 of the sequence diagram 800.

At an operation 1260, the POS terminal 110 may generate a PIN block as described above with reference to 860 of the sequence diagram 800.

At an operation 1262, the POS terminal 110 may send a transfer request as described above with reference to 862 of the sequence diagram 800.

While not illustrated in FIG. 12, the POS terminal 110 may receive a response to the transfer request. The response may indicate whether the transfer request was approved and/or completed.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computing system comprising:
   a communications module;
   a processor coupled with the communications module; and
   a memory coupled to the processor and storing processor-executable instructions which, when executed by the processor, configure the computing system to:
   receive an authentication request from a device, the authentication request including a unique identifier;

authenticate the authentication request by:
retrieving a non-fungible token (NFT) identifier and public key associated with the unique identifier;
identifying, from a blockchain, a blockchain address that is an owner of an NFT represented by the NFT identifier;
verifying that the blockchain address that is the owner of the NFT is associated with the public key that is associated with the unique identifier; and
verifying that a private key stored in a secure area of the device is associated with the public key that is associated with the unique identifier; and
after authenticating the authentication request, enable an operation not available prior to authenticating the authentication request.

2. The computing system of claim 1, wherein the unique identifier is a primary account number for a payment credential and wherein enabling the operation includes enabling completion of a transaction at a point-of-sale terminal using the payment credential.

3. The computing system of claim 2, wherein enabling the completion of the transaction includes setting an authentication flag associated with the NFT identifier to indicate that the authentication request has been authenticated.

4. The computing system of claim 2, wherein the processor is further configured to cause the computing system to send the NFT identifier to the point-of-sale terminal, and wherein the point-of-sale terminal is configured to generate a personal identification number (PIN) block for a transaction message based on the NFT identifier.

5. The computing system of claim 4, wherein the instructions further cause the computing system to determine that an authentication flag associated with an NFT identifier represented by a PIN block for a received transaction message is set to indicate that an authentication request has been authenticated.

6. The computing system of claim 1, wherein the processor is further configured to cause the computing system to link a unique identifier with an NFT by:
receiving, from a device, the public key associated with the unique identifier, the public key forming a key pair with the private key stored in the secure area of the device;
assigning ownership of an NFT to a blockchain public address derived from the public key; and
storing an NFT identifier associated with the NFT in association with the unique identifier.

7. The computing system of claim 6, wherein the unique identifier is associated with a payment card that is issued digitally and wherein the processor is configured to cause the computing system to link the unique identifier with the NFT after the device has received a digital representation of the payment card.

8. The computing system of claim 6, wherein the key pair is generated within the secure area of the device.

9. The computing system of claim 1, wherein the authentication request is received from the device in response to the device scanning a machine-readable code displayed on a point-of-sale terminal.

10. The computing system of claim 1, wherein the unique identifier is obtained via image recognition of an image captured of a physical token, and wherein the image recognition includes optical character recognition.

11. A method comprising:
receiving an authentication request from a device, the authentication request including a unique identifier;
authenticating the authentication request by:
retrieving a non-fungible token (NFT) identifier and public key associated with the unique identifier;
identifying, from a blockchain, a blockchain address that is an owner of an NFT represented by the NFT identifier;
verifying that the blockchain address that is the owner of the NFT is associated with the public key that is associated with the unique identifier; and
verifying that a private key stored in a secure area of the device is associated with the public key that is associated with the unique identifier; and
after authenticating the authentication request, enabling an operation not available prior to authenticating the authentication request.

12. The method of claim 11, wherein the unique identifier is a primary account number for a payment credential and wherein enabling the operation includes enabling completion of a transaction at a point-of-sale terminal using the payment credential.

13. The method of claim 12, wherein enabling the completion of the transaction includes setting an authentication flag associated with the NFT identifier to indicate that the authentication request has been authenticated.

14. The method of claim 12, further comprising sending the NFT identifier to the point-of-sale terminal, and wherein the point-of-sale terminal is configured to generate a personal identification number (PIN) block for a transaction message based on the NFT identifier.

15. The method of claim 14, further comprising determining that an authentication flag associated with an NFT identifier represented by a PIN block for a received transaction message is set to indicate that an authentication request has been authenticated.

16. The method of claim 11, further comprising linking a unique identifier with an NFT by:
receiving, from a device, the public key associated with the unique identifier, the public key forming a key pair with the private key stored in the secure area of the device;
assigning ownership of an NFT to a blockchain public address derived from the public key; and
storing an NFT identifier associated with the NFT in association with the unique identifier.

17. The method of claim 16, wherein the unique identifier is associated with a payment card that is issued digitally and wherein the linking of the unique identifier with the NFT is performed after the device has received a digital representation of the payment card.

18. The method of claim 16, wherein the key pair is generated within the secure area of the device.

19. The method of claim 11, wherein the authentication request is received from the device in response to the device scanning a machine-readable code displayed on a point-of-sale terminal.

20. A non-transitory computer readable storage medium comprising computer-executable instructions which, when executed, cause a computing system to:
receive an authentication request from a device, the authentication request including a unique identifier;
authenticate the authentication request by:
retrieving a non-fungible token (NFT) identifier and public key associated with the unique identifier;
identifying, from a blockchain, a blockchain address that is an owner of an NFT represented by the NFT identifier;

verifying that the blockchain address that is the owner of the NFT is associated with the public key that is associated with the unique identifier; and verifying that a private key stored in a secure area of the device is associated with the public key that is associated with the unique identifier; and after authenticating the authentication request, enable an operation not available prior to authenticating the authentication request.

\* \* \* \* \*